(12) United States Patent
She

(10) Patent No.: US 7,344,117 B2
(45) Date of Patent: Mar. 18, 2008

(54) ADJUSTABLE LIFT SUPPORT APPARATUS

(75) Inventor: Wei-Shin She, Taoyuan (TW)

(73) Assignee: Benq Corporation, Taoyuan (TW)

( * ) Notice: Subject to any disclaimer, the term of this patent is extended or adjusted under 35 U.S.C. 154(b) by 0 days.

(21) Appl. No.: 11/325,851

(22) Filed: Dec. 30, 2005

(65) Prior Publication Data

US 2006/0175512 A1  Aug. 10, 2006

(30) Foreign Application Priority Data

Dec. 31, 2004  (TW) ............................... 93141917 A

(51) Int. Cl.
*F16M 11/00* (2006.01)

(52) U.S. Cl. ..................... 248/408; 248/407; 248/409; 248/413; 248/354.4; 403/109.1; 403/109.2; 403/377; 254/98; 254/102; 254/133; 254/7 B

(58) Field of Classification Search ........ 248/407–409, 248/413, 354.1, 354.4, 354.6, 354.7, 917, 248/919; 403/109.1, 109.2, 377; 254/92, 254/98, 102, 133 R, 7 R, 7 B
See application file for complete search history.

(56) References Cited

U.S. PATENT DOCUMENTS

| | | | | |
|---|---|---|---|---|
| 511,262 A | * | 12/1893 | Bobrick ...................... 248/407 |
| 1,320,613 A | * | 11/1919 | Gilcrease .................... 248/352 |
| 1,441,963 A | * | 1/1923 | Bullis ......................... 254/102 |
| 1,860,014 A | * | 5/1932 | Cheape ........................ 254/100 |
| 1,899,131 A | * | 2/1933 | Bedard et al. .............. 254/102 |
| 1,951,754 A | * | 3/1934 | Early ........................... 403/108 |
| 2,722,970 A | * | 11/1955 | Stechmann ............... 248/188.2 |
| 3,179,071 A | * | 4/1965 | Johnston ................... 108/147.2 |
| 3,583,743 A | * | 6/1971 | Newell ........................ 292/339 |
| 3,870,278 A | * | 3/1975 | Lee .............................. 254/98 |
| 4,339,104 A | * | 7/1982 | Weidman .................... 248/407 |
| 4,541,813 A | * | 9/1985 | Ikeda .......................... 446/424 |
| 4,867,406 A | * | 9/1989 | Lengacher .................. 248/409 |
| 4,949,809 A | * | 8/1990 | Levi et al. ................... 182/172 |
| 5,180,131 A | * | 1/1993 | Few ............................. 248/352 |
| 5,320,439 A | * | 6/1994 | Perrault et al. ........... 403/379.1 |
| 5,379,974 A | * | 1/1995 | Slay et al. .................. 248/161 |
| 2003/0106972 A1 | * | 6/2003 | Hsu et al. ................ 248/188.2 |
| 2004/0079845 A1 | * | 4/2004 | Wilcox ..................... 248/188.5 |

* cited by examiner

*Primary Examiner*—Carl D. Friedman
*Assistant Examiner*—Michael McDuffie
(74) *Attorney, Agent, or Firm*—Birch, Stewart, Kolasch & Birch, LLP.

(57) ABSTRACT

An adjustable lift support apparatus includes a base, a sleeve attached onto the base, at least one meshing device, a shaft, and a support attached at the shaft. At least one groove is formed on an inner surface of the sleeve along a first axial direction. Each meshing device corresponds to one of the at least one groove and includes a flexible protrusion. The shaft is inserted into the sleeve. At least one rack is provided on an outer surface of the shaft along a second axial direction, such that the flexible protrusion of the meshing device is meshed between two neighboring teeth of the at least one rack. The support is lifted or lowered by an external force to make each of the at least one rack move with respect to the flexible protrusion of the corresponding meshing device, so as to adjust the height of the support.

20 Claims, 9 Drawing Sheets

ADJUSTABLE LIFT SUPPORT APPARATUS

BACKGROUND OF THE INVENTION

1. Field of the Invention

The present invention relates to an adjustable lift support apparatus, and more particularly to an adjustable lift support apparatus capable of preventing the function from failure after being used for a span of time.

2. Description of the Prior Art

Recently, flat panel displays have become increasingly popular substitutes for projection devices and cathode ray tube (CRT) displays. The flat panel display, e.g. liquid crystal display (LCD), is typically mounted on a lift apparatus to be lifted or lowered.

Ideally, the height of the flat panel display can be adjusted for optimum viewing. Various prior arts with regard to the lift apparatus have been used, such as mechanical ball track with constant force spring, mechanical linkages with springs, and so on. However, because the torsion of the springs of the above-mentioned lift apparatus always maintains constant and cannot be adjusted, it is inconvenient for various users. Furthermore, after the lift apparatus is used for a span of time, the spring may lose its elasticity due to the fatigue. Moreover, the cost of the above-mentioned lift apparatus is more expensive, and the structure is more complicated.

Therefore, the objective of the present invention is to provide an adjustable lift support apparatus to solve the above-mentioned problems.

SUMMARY OF THE INVENTION

The objective of the present invention is to provide an adjustment lift support apparatus utilizing at least one rack together with a corresponding elastic plate to fix a support of the apparatus at a desired height, such that the external force applied to lift or lower the support is adjustable. Furthermore, according to the present invention, the adjustable lift support apparatus won't lose its function after being used for a span of time. Moreover, the cost of the present invention is lower and the structure is simpler than the prior art.

According to a preferred embodiment of the present invention, the adjustable lift support apparatus includes a base, a sleeve, at least one meshing device, a shaft, and a support. The sleeve is attached onto the base via a tile end of the sleeve and has an inner surface. At least one groove is formed on the inner surface from a head end of the sleeve along a first axial direction. Each meshing device corresponds to one of the at least one groove, is mounted within the corresponding groove, and includes a flexible protrusion disposed toward the first axial direction. The shaft is inserted into the sleeve via a first end of the shaft and has an outer surface. At least one rack, consisting of a plurality of teeth, is provided along a second axial direction. Each rack respectively corresponds to one of the at least one groove and is partially disposed within the corresponding groove, such that the flexible protrusion of the corresponding meshing device is meshed between two neighboring teeth of the at least one rack. The support is attached onto a second end of the shaft.

According to the above-mentioned adjustable lift support apparatus, the lifting and the lowering of the support together with the shaft is actuated by applying an external force on the support or the shaft, so as to make each rack move with respect to the flexible protrusion of the corresponding meshing device until the flexible protrusion of the corresponding meshing device is meshed between the two neighboring teeth of the at least one rack at a desired height.

Accordingly, the adjustable lift support apparatus of the present invention utilizes at least one rack together with a corresponding elastic plate to fix a support of the apparatus at a desired height, such that the external force applied to lift or lower the support is adjustable. Furthermore, according to the present invention, the adjustable lift support apparatus won't lose its function after being used for a span of time. Moreover, the cost of the present invention is lower and the structure is simpler than the prior art.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
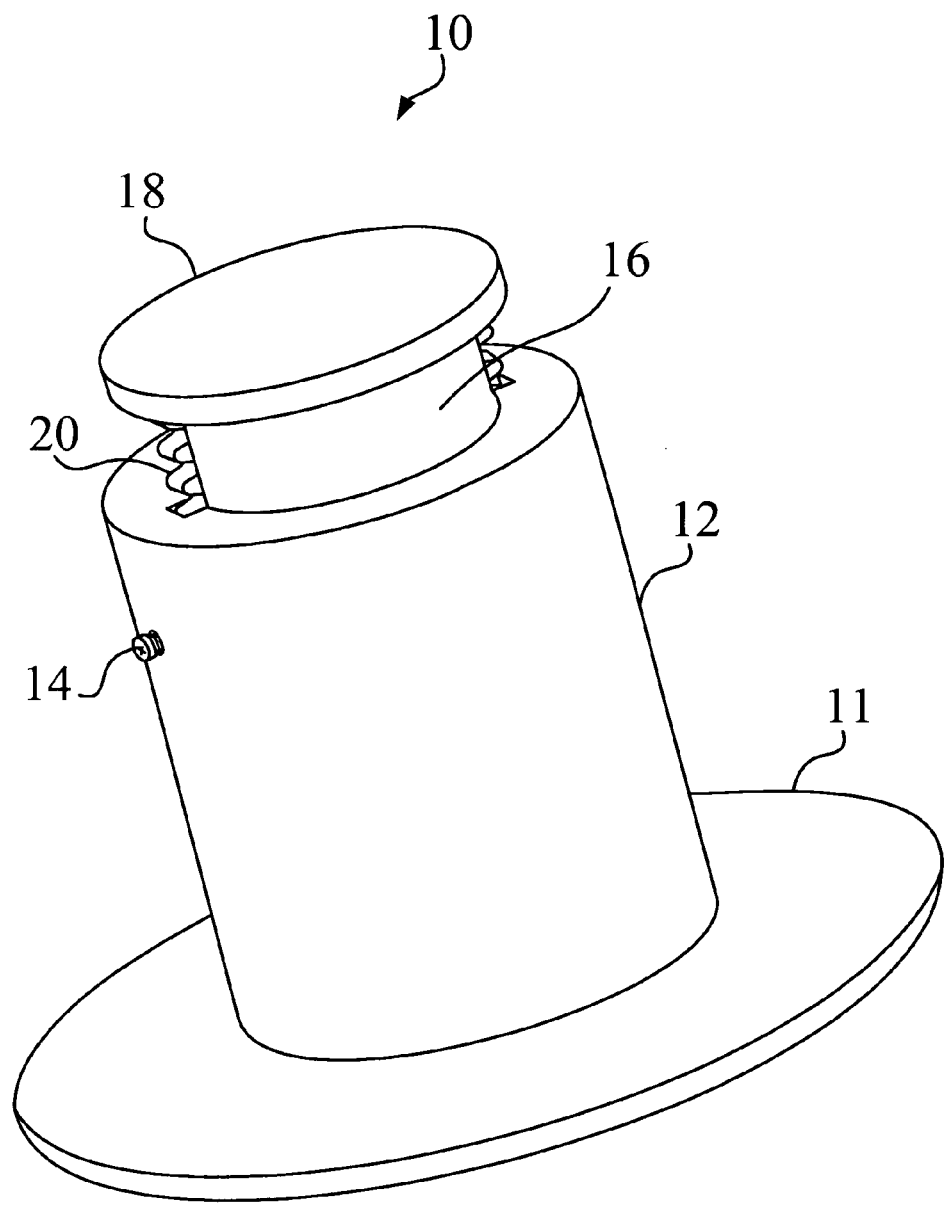
FIG. 1 is an outside view illustrating an adjustable lift support apparatus according to a preferred embodiment of the present invention.
Figure 2A:
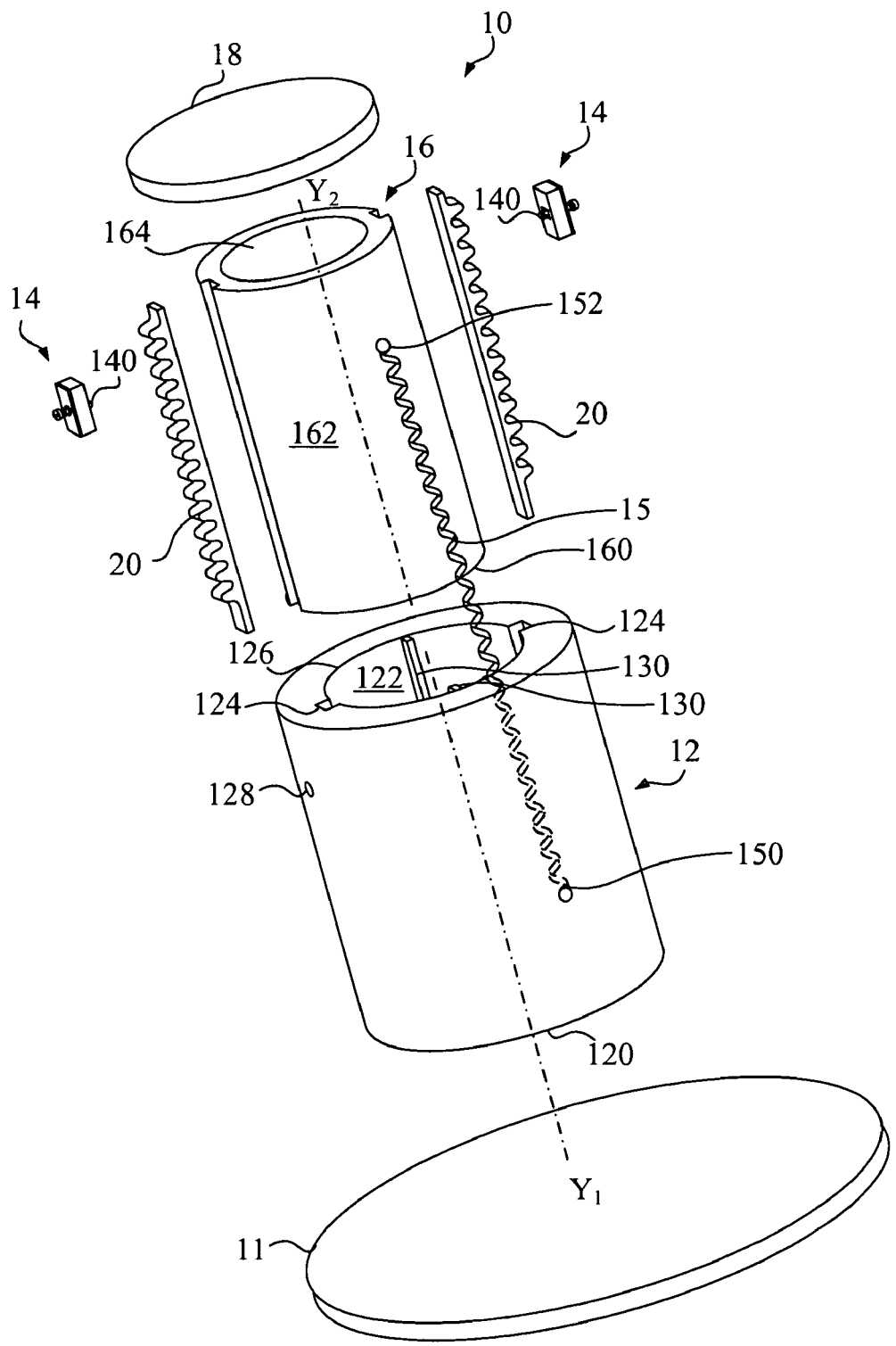
FIGS. 2A and 2B are exploded views illustrating the adjustable lift support apparatus shown in FIG. 1.
Figure 2B:
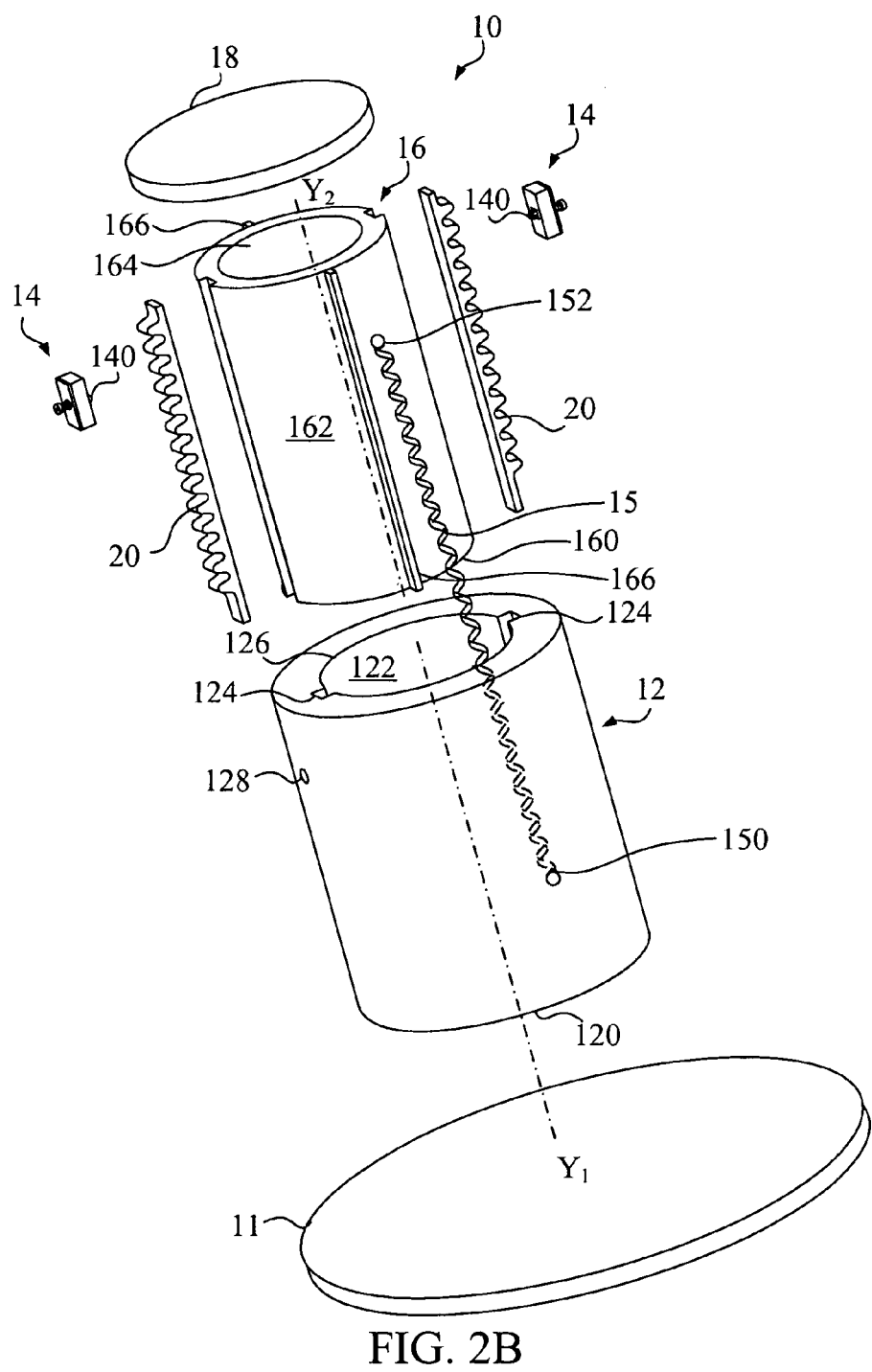

Referring to FIGS. 1, 2A and 2B, FIG. 1 is an outside view illustrating an adjustable lift support apparatus 10 according to a preferred embodiment of the present invention. FIGS. 2A and 2B are exploded views illustrating the adjustable lift support apparatus 10 shown in FIG. 1. The adjustable lift support apparatus 10 includes a base 11, a sleeve 12, at least one meshing device 14, a shaft 16, and a support 18. For practical application, the sleeve 12 and the shaft 16 both are substantially pillar-shaped or arc-shaped. In this embodiment, the sleeve 12 and the shaft 16 both are cylinders, and the adjustable lift support apparatus 10 includes two meshing devices 14.

As shown in FIGS. 2A and 2B, the sleeve 12 is attached onto the base 11 via a tail end 120 of the sleeve 12 and has an inner surface 122. At least one groove 124 is formed on the inner surface 122 from a head end 126 of the sleeve 12 along a first axial direction $Y_1$. In this embodiment, two grooves 124 are formed on the inner surface 122 of the sleeve 12, and each groove 124 has a respective first hole 128 thereon. Each meshing device 14 corresponds to one of the two grooves 124, is mounted within the corresponding groove 124, and includes a flexible protrusion 140 disposed toward the first axial direction $Y_1$. The shaft 16 is inserted into the sleeve 12 via a first end 160 of the shaft 16 and has an outer surface 162. At least on rack 20 is provided on the outer surface 162 of the shaft 16 and along a second axial direction $Y_2$. In this embodiment, two racks 20 are provided on the outer surface 162 of the shaft 16 and along the second axial direction $Y_2$. Each rack 20 consists of a plurality of teeth. Each rack 20 respectively corresponds to one of the two grooves 124 and is partially disposed within the corresponding groove 124, such that the flexible protrusion 140 of the corresponding meshing device 14 is meshed between two neighboring teeth of the rack 20. The support 18 is attached onto a second end 164 of the shaft 16.

Figure 3:
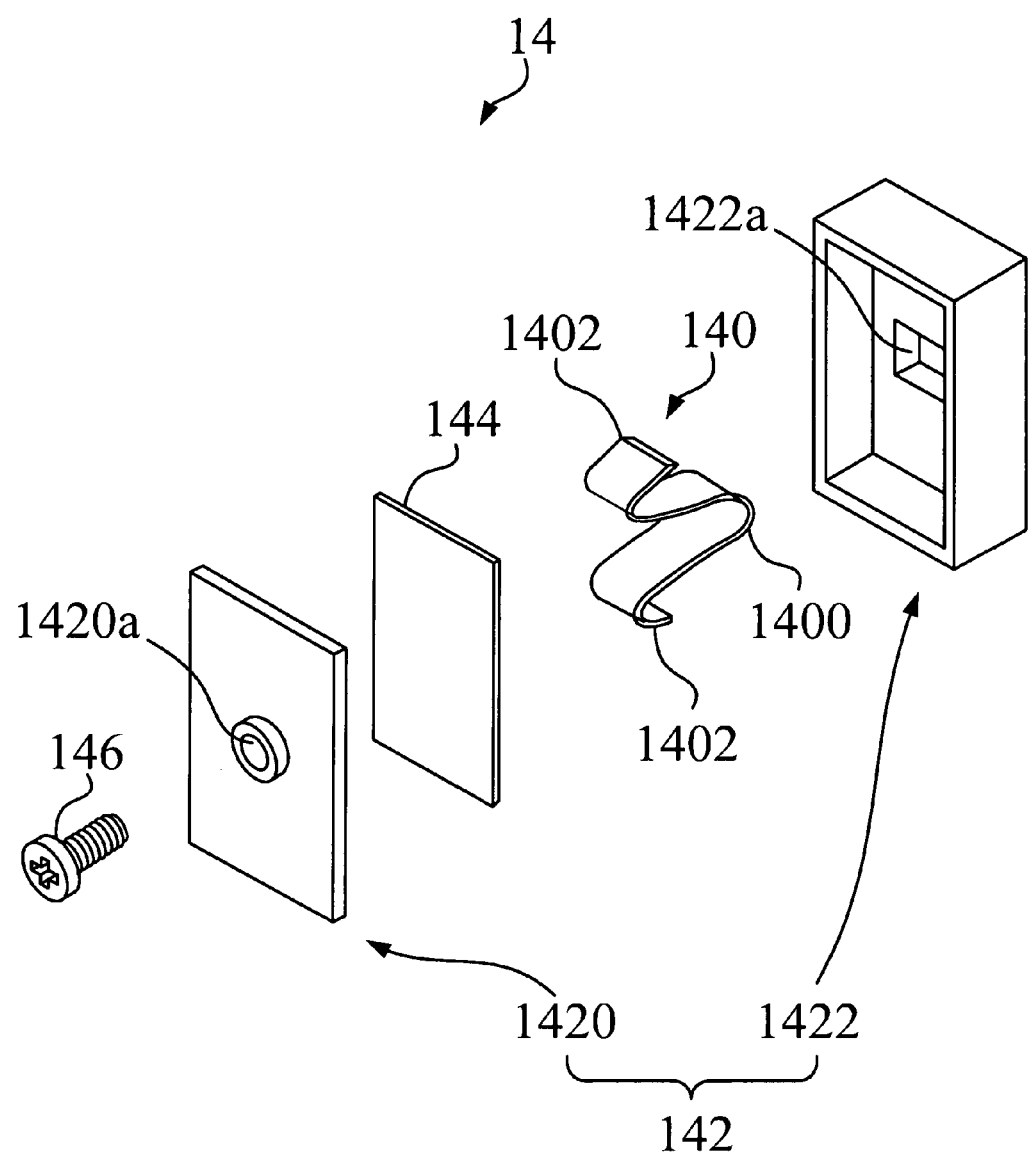
FIG. 3 is an exploded view illustrating the meshing device shown in FIG. 2.

Referring to FIG. 3, FIG. 3 is an exploded view illustrating the meshing device 14 shown in FIG. 2. The meshing device 14 further includes a casing 142, a press plate 144, and an adjustable screw 146. In this embodiment, the casing 142 includes a top cover 1420 and a box 1422. The top cover 1420 has a second hole 1420a thereon corresponding to the first hole 128, and the box 1422 has an opening 1422a thereon opposite to the second hole 1420a. The flexible protrusion 140 has a protruding part 1400 outside the opening 1422a of the casing 142, so as to be meshed between two neighboring teeth of the corresponding rack 20. The flexible protrusion 140 also has at least one extension part 1402 which is stretched from the protruding part 1400.

As shown in FIG. 3, the press plate 144 is positioned between the top cover 1420 and the extension part 1402 of the flexible protrusion 150, and the press plate 144 contacts the extension part 1402 of the flexible protrusion 140. The adjustable screw 146 is inserted through the first hole 128 and the second hole 1420a, and the press plate 144 is attached onto a proximal end of the adjustable screw 146. Accordingly, the adjustable screw 146 is capable of being threaded with respect to the first hole 128 and the second hole 1420a to actuate the press plate 144, the extension part 1402 of the flexible protrusion 140, and the protruding part 1400, so as to adjust a gap between the protruding part 1400 and the teeth meshed with the protruding part 1400.

According to the above-mentioned adjustable lift support apparatus 10, the lifting and the lowering of the support 18 together with the shaft 16 is actuated by applying an external force on the support 18 or the shaft 16 to make each rack 20 move with respect to the flexible protrusion 140 of the corresponding meshing device 14, until the flexible protrusion 140 of the corresponding meshing device 14 is meshed between the two neighboring teeth of the rack 20 at a desired height. If the gap, between the protruding part 1400 and the teeth meshed with the protruding part 1400, is larger, the external force applied on the support 18 may be less. On the other hand, if the gap, between the protruding part 1400 and the teeth meshed with the protruding part 1400, is smaller, the external force applied on the support 18 should be more.

Figure 4:
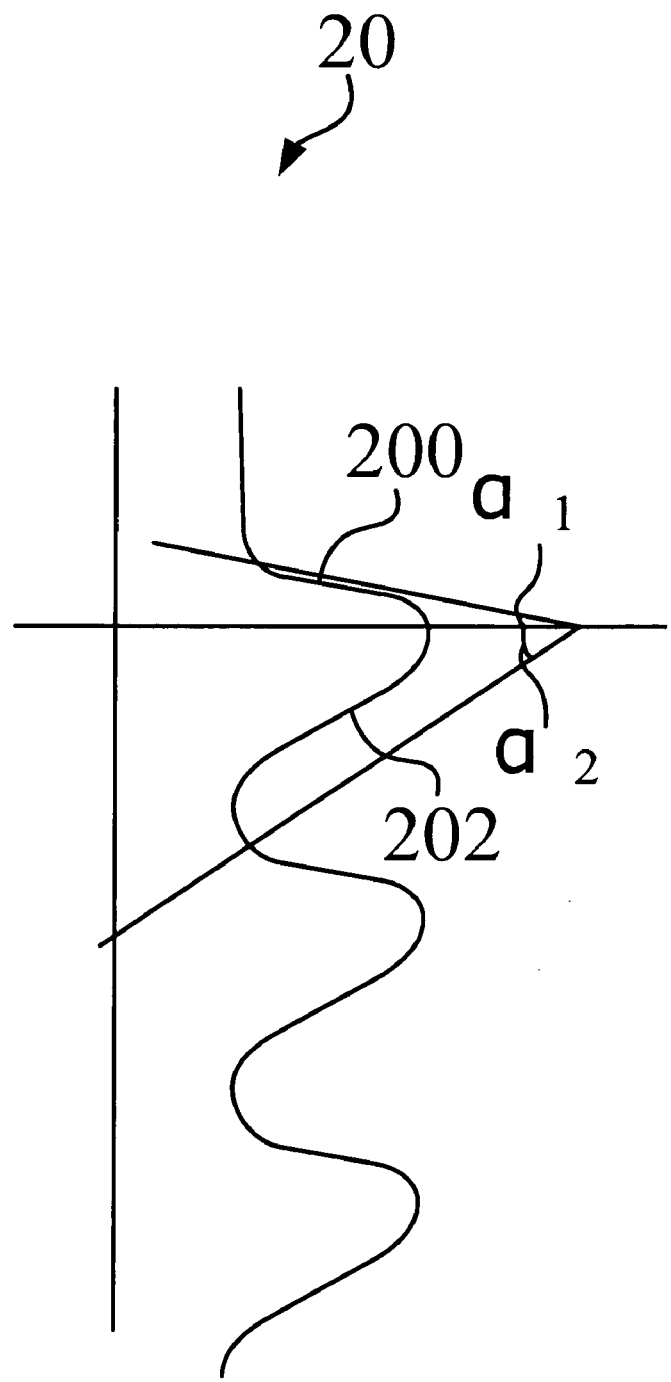
FIG. 4 is a side view illustrating part of the rack shown in FIG. 2.

Referring to FIG. 4, FIG. 4 is a side view illustrating part of the rack 20 shown in FIG. 2. Each tooth of the rack 20 has a specific profile. As shown in FIG. 4, each tooth of the rack 20 has a top surface 200 and a bottom surface 202. When the adjustable lift support apparatus 10 is used, the top surface 200 faces the support 18 and the bottom surface 202 faces the base 11, and the oblique angle $\alpha_1$ of the top surface 200 is smaller than the oblique angle $\alpha_2$ of the bottom surface 202, such that the external force applied to lift the support 18 is less than the external force applied to lower the support 18. The profile of each tooth of the rack 20 may be designed based on practical requirement.

Figure 5:
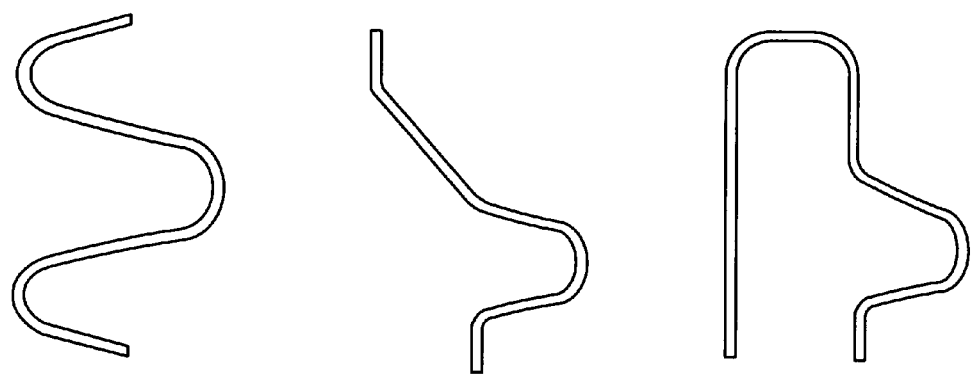
FIG. 5 is a side view illustrating three different types of the flexible protrusion shown in FIG. 3.

Referring to FIG. 5, FIG. 5 is a side view illustrating three different types of the flexible protrusion 140 shown in FIG. 3. The flexible protrusion 140 may be designed based on practical requirement, as shown in FIG. 5.

Furthermore, according to another preferred embodiment of the present invention, the sleeve 12 may have at least one rib 130 (as shown in FIG. 2A) formed on the inner surface 122 and the at least one rib 130 contacts the outer surface 162 of the shaft 16, so as to reduce friction when the sleeve 12 moves with respect to the shaft 16, or the shaft 16 may have at least one rib 166 formed on the outer surface 162 and the at least one rib 166 (as shown in FIG. 2B) contacts the inner surface 122 of the sleeve 12, so as to reduce friction when the sleeve 12 moves with respect to the shaft 16.

According to another preferred embodiment of the present invention, the rack 20 and the shaft 16 are formed integrally.

According to another preferred embodiment of the present invention, the adjustable lift support apparatus 10 further includes a resilient member 15 positioned within the sleeve 12 and between the first end 160 of the shaft 16 and the base 11, so as to assist the shaft 16 in moving with respect to the sleeve 12. On the other hand, the resilient member 15 may also be positioned between the inner surface 122 of the sleeve 12 and the outer surface 162 of the shaft 16, via a third end 150 of the resilient member 15 attached onto the inner surface 122 of the sleeve 12, and via a fourth end 152 of the resilient member 15 attached onto the outer surface 162 of the shaft 16, so as to assist the shaft 16 in moving with respect to the sleeve 12. The resilient member 15 may be a spring, such as tension spring or constant force spring.

Figure 6:
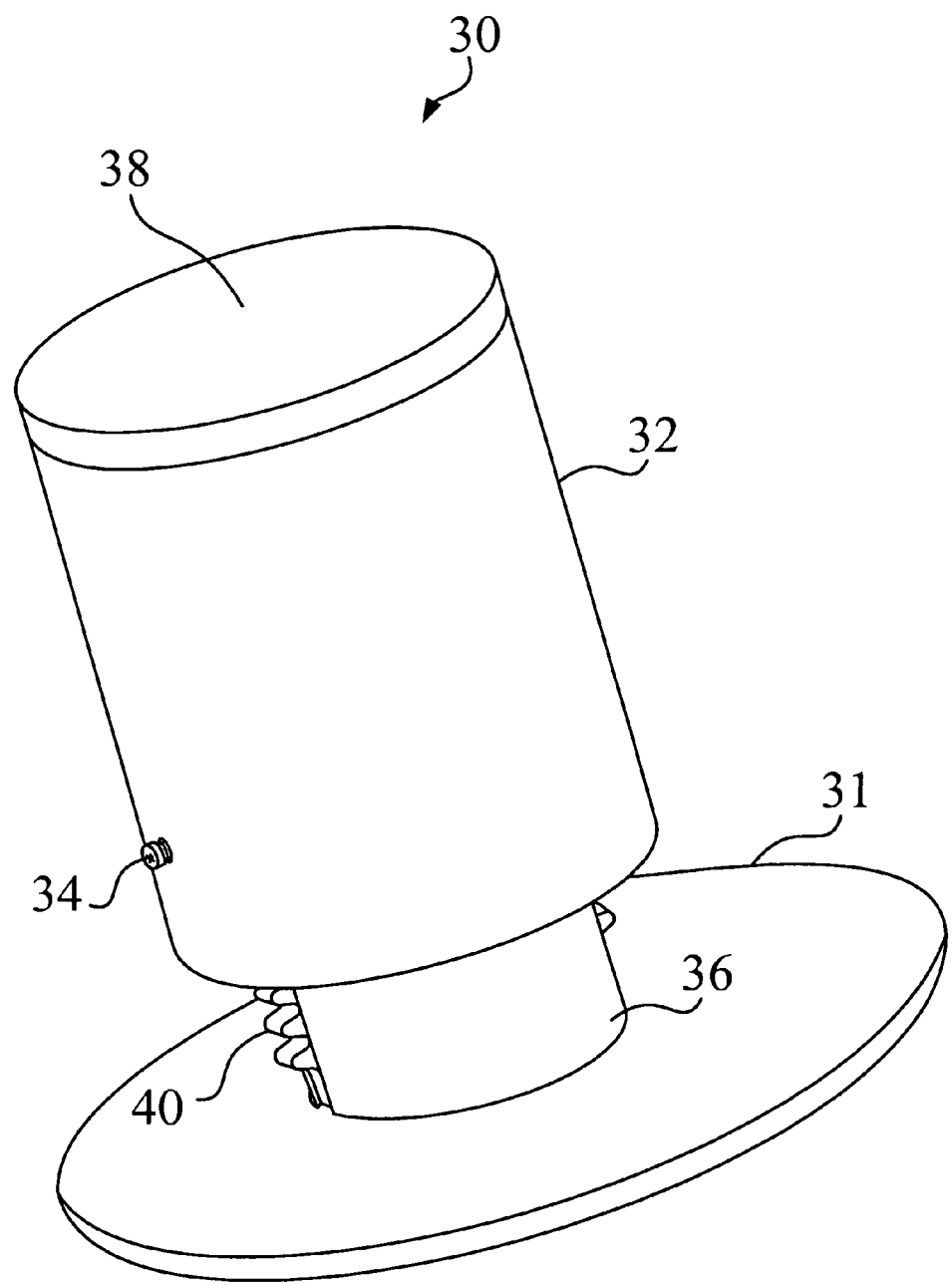
FIG. 6 is an outside view illustrating an adjustable lift support apparatus according to another preferred embodiment of the present invention.
Figure 7A:
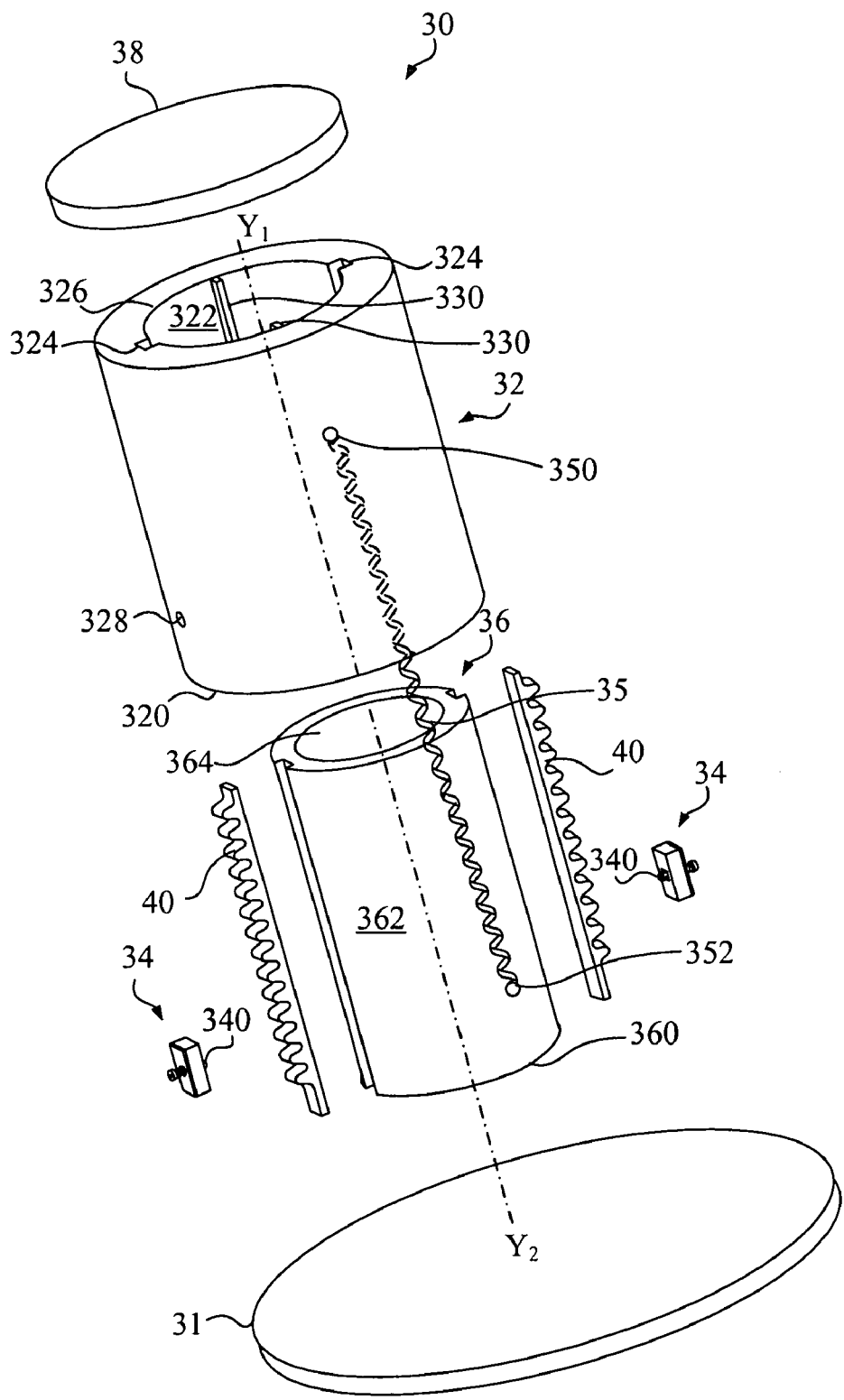
FIGS. 7A and 7B are exploded views illustrating the adjustable lift support apparatus shown in FIG. 6.
Figure 7B:
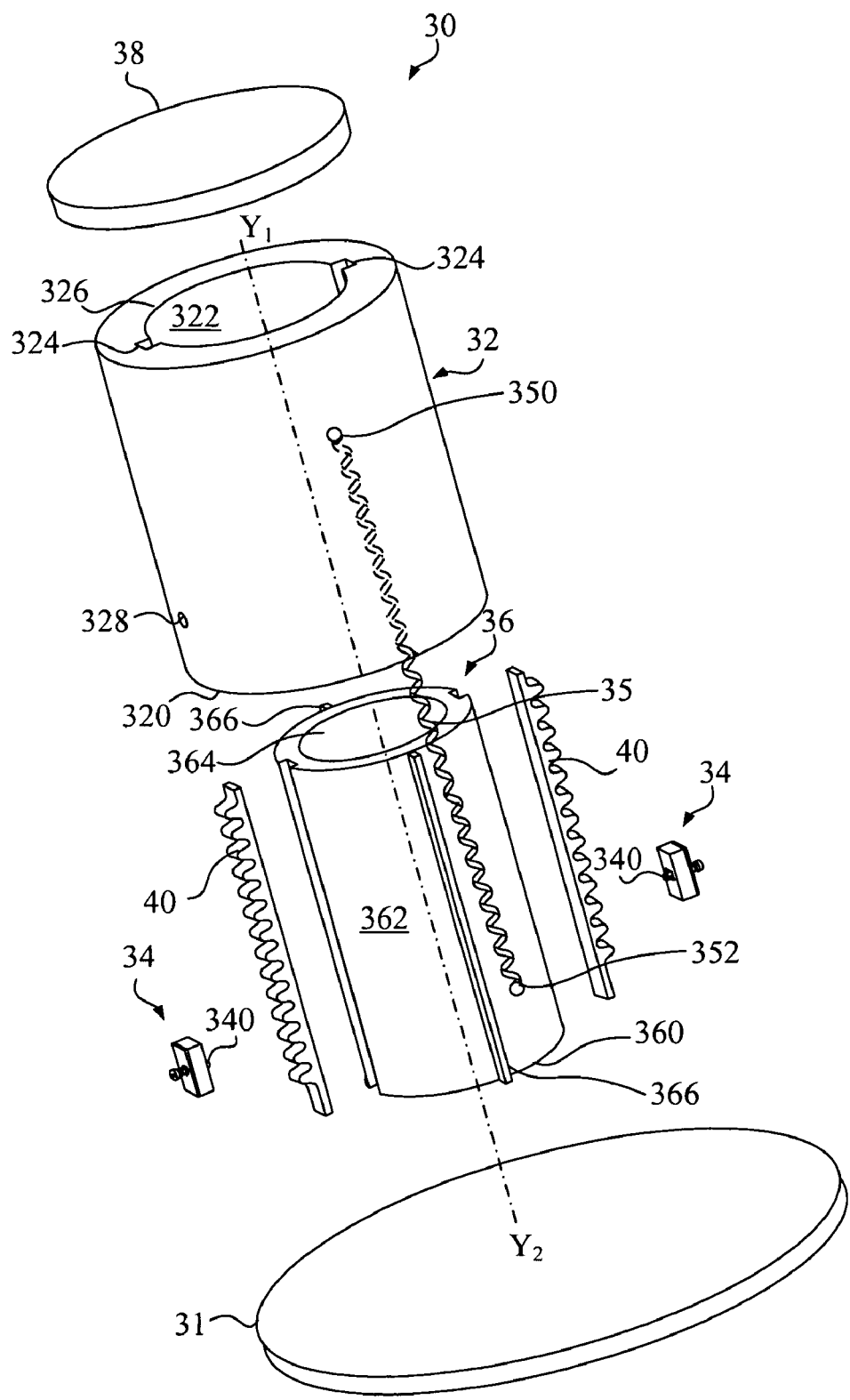

Referring to FIGS. 6, 7A and 7B, FIG. 6 is an outside view illustrating an adjustable lift support apparatus 30 according to another preferred embodiment of the present invention. FIGS. 7A and 7B are exploded views illustrating the adjustable lift support apparatus 30 shown in FIG. 6. The adjustable lift support apparatus 30 includes a base 31, a sleeve 32, at least one meshing device 34, a shaft 36, and a support 38. For practical application, the sleeve 32 and the shaft 36 both are substantially pillar-shaped or arc-shaped. In this embodiment, the sleeve 32 and the shaft 36 both are cylinders, and the adjustable lift support apparatus 30 includes two meshing devices 34.

As shown in FIGS. 7A and 7B, the support 38 is attached onto a head end 326 of the sleeve 32, and the sleeve 32 has an inner surface 322. At least one groove 324 is formed on the inner surface 322 from the head end 326 of the sleeve 32 along a first axial direction $Y_1$. In this embodiment, two grooves 324 are formed on the inner surface 322 of the sleeve 32, and each groove 324 has a respective first hole 328 thereon. Each meshing device 34 corresponds to one of the two grooves 324, is mounted within the corresponding groove 324, and includes a flexible protrusion 340 disposed toward the first axial direction $Y_1$. The shaft 36 is attached on to the base 31 via a first end 360 of the shaft 36 and inserted into the sleeve 32 via a second end 364 of the shaft 36. The shaft 36 has an outer surface 362 on which at least one rack 40 consisting of a plurality of teeth is provided along a second axial direction $Y_2$. In this embodiment, two racks 40 are provided on the outer surface 362 of the shaft 36 and along the second axial direction $Y_2$. Each rack 40 respectively corresponds to one of the two grooves 324 and is partially disposed within the corresponding groove 324, such that the flexible protrusion 340 of the corresponding meshing device 34 is meshed between two neighboring teeth of the rack 40. The function and principle of the meshing device 34 of the adjustable lift support apparatus 30 shown in FIG. 6 are the same as the meshing device 14 of the adjustable lift support apparatus 10 shown in FIG. 1, and duplicated description is not given again here.

According to the above-mentioned adjustable lift support apparatus 30, the lifting and the lowering of the support 38 together with the sleeve 32 is actuated by applying an external force on the support 38 or the sleeve 32 to make each rack 40 move with respect to the flexible protrusion 340 of the corresponding meshing device 34, until the flexible protrusion 340 of the corresponding meshing device 34 is meshed between the two neighboring teeth of the rack 40 at a desired height.

Furthermore, according to another preferred embodiment of the present invention, the sleeve 32 may has at least one rib 330 (as shown in FIG. 7A) formed on the inner surface 322 and the at least one rib 330 contacts the outer surface 362 of the shaft 36, so as to reduce friction when the sleeve 32 moves with respect to the shaft 36, or the shaft 36 may has at least one rib 366 (as shown in FIG. 7B) formed on the outer surface 362 and the at least one rib 366 contacts the inner surface 322 of the sleeve 32, so as to reduce friction when the sleeve 32 moves with respect to the shaft 36.

According to another preferred embodiment of the present invention, the rack 40 and the shaft 36 are formed integrally.

According to another preferred embodiment of the present invention, the adjustable lift support apparatus 30 further includes a resilient member 35 positioned within the sleeve 32 and between the support 38 and the second end 364 of the shaft 36, so as to assist the sleeve 32 in moving with respect to the shaft 36. On the other hand, the resilient member 35 may also be positioned between the inner surface 322 of the sleeve 32 and the outer surface 362 of the shaft 36, via a third end 350 of the resilient member 35 attached onto the inner surface 322 of the sleeve 32, and via a fourth end 352 of the resilient member 35 attached onto the outer surface 362 of the shaft 36, so as to assist the sleeve 32 in moving with respect to the shaft 36. The resilient member 35 may be a spring, such as tension spring or constant force spring.

Compared to the prior art, the adjustable lift support apparatus of the present invention utilizes at least one rack together with a corresponding elastic plate to fix a support of the apparatus at a desired height, such that the external force applied to lift or lower the support is adjustable. Furthermore, according to the present invention, the adjustable lift support apparatus won't lose its function after being used for a span of time. Moreover, the cost of the present invention is lower and the structure is simpler than the prior art.

With the example and explanations above, the features and spirits of the invention will be hopefully well described. Those skilled in the art will readily observe that numerous modifications and alternations of the device may be made while retaining the teaching of the invention. Accordingly, the above disclosure should be construed as limited only by the metes and bounds of the appended claims.

What is claimed is:

1. An adjustable lift support apparatus, comprising:
   a base;
   a sleeve, attached onto the base via a tail end of the sleeve, having an inner surface on which at least one groove is formed from a head end of the sleeve along a first axial direction;
   at least one meshing device each of which corresponds to one of the at least one groove, each of the at least one meshing device being mounted within the corresponding groove and comprising a flexible protrusion disposed toward the first axial direction;
   a shaft, inserted into the sleeve via a first end of the shaft, having an outer surface on which at least one rack consisting of a plurality of teeth is provided along a second axial direction, each of the at least one rack respectively corresponding to one of the at least one groove and being partially disposed within the corresponding groove, such that the flexible protrusion of the corresponding meshing device is meshed between two neighboring teeth of said at least one rack; and
   a support, attached onto a second end of the shaft;
   wherein the lifting and the lowering of the support together with the shaft is actuated by applying an external force on the support or the shaft to make each of the at least one rack move with respect to the flexible protrusion of the corresponding meshing device, until the flexible protrusion of the corresponding meshing device is meshed between the two neighboring teeth of said at least one rack at a desired height.

2. The adjustable lift support apparatus of claim 1, wherein each of the at least one groove of the sleeve has a respective first hole thereon, and the meshing device, corresponding to said one groove, comprises:
   a casing thereon having a second hole corresponding to the first hole and an opening opposite to the second hole, wherein the flexible protrusion has a protruding part outside the opening of the casing, so as to be meshed between two neighboring teeth of the corresponding rack, and at least one extension part projecting from the protruding part;
   a press plate, positioned between the second hold and the at least one extension part, the press plate contacting the at least one extension part of the flexible protrusion; and
   an adjustable screw, inserted through the first hole and the second hole, the press plate being attached onto a proximal end of the adjustable screw, the adjustable screw being capable of being threaded with respect to the first hole and the second hole to actuate the press plate, the at least one extension part and the protruding part, so as to adjust a gap between the protruding part and the teeth meshed with the protruding part.

3. The adjustable lift support apparatus of claim 1, wherein the sleeve further has at least one rib formed on the inner surface and the at least one rib contacts the outer surface of the shaft, so as to reduce friction when the sleeve moves with respect to the shaft.

4. The adjustable lift support apparatus of claim 1, wherein the shaft further has at least one rib formed on the outer surface and the at least one rib contacts the inner surface of the sleeve, so as to reduce friction when the sleeve moves with respect to the shaft.

5. The adjustable lift support apparatus of claim 1, wherein the sleeve and the shaft both are pillar-shaped.

6. The adjustable lift support apparatus of claim 1, wherein the sleeve and the shaft both are arc-shaped.

7. The adjustable lift support apparatus of claim 1, wherein each of the teeth of the at least one rack has a top surface and a bottom surface, when the adjustable lift support apparatus is used, the top surface faces the support and the bottom surface faces the base, and the oblique angle of the top surface is smaller than the oblique angle of the bottom surface, such that the external force applied to lift the support is less than the external force applied to lower the support.

8. The adjustable lift support apparatus of claim 1, wherein the at least one rack and the shaft are formed integrally.

9. The adjustable lift support apparatus of claim 1, further comprising a resilient member positioned within the sleeve and between the first end of the shaft and the base, so as to assist the shaft in moving with respect to the sleeve.

10. The adjustable lift support apparatus of claim 1, further comprising a resilient member, positioned between the inner surface of the sleeve and the outer surface of the shaft, via a third end of the resilient member attached onto the inner surface of the sleeve, and via a fourth end of the resilient member attached onto the outer surface of the shaft, so as to assist the shaft in moving with respect to the sleeve.

11. An adjustable lift support apparatus, comprising:
a support;
a sleeve having an inner surface on which one groove is formed from a head end of the sleeve along a first axial direction, the support being attached onto the head end of the sleeve;
at least one meshing device each of which corresponds to one of the at least one groove, each of the at least one meshing device being mounted within the corresponding groove and comprising a flexible protrusion disposed toward the first axial direction;
a base; and
a shaft, attached onto the base via a first end of the shaft and inserted into the sleeve via a second end of the sleeve, having an outer surface on which at least one rack consisting of a plurality of teeth is provided along a second axial direction, each of the at least one rack respectively corresponding to one of the at least one groove and being partially disposed within the corresponding groove, such that the flexible protrusion of the corresponding meshing device is meshed between two neighboring teeth of said at least one rack;
wherein the lifting and the lowering of the support together with the sleeve is actuated by applying an external force on the support or the sleeve to make each of the at least one rack move with respect to the flexible protrusion of the corresponding meshing device, until the flexible protrusion of the corresponding meshing device is meshed between the two neighboring teeth of said at least one rack at a desired height.

12. The adjustable lift support apparatus of claim 11, wherein each of the at least one groove of the sleeve has a respective first hole thereon, and the meshing device, corresponding to said one groove, comprises:
a casing thereon having a second hole corresponding to the first hole and an opening opposite to the second hole, wherein the flexible protrusion has a protruding part outside the opening of the casing, so as to be meshed between two neighboring teeth of the corresponding rack, and at least one extension part projecting from this protruding part;
a press plate, positioned between the second hole and the at least one extension part, the press plate contacting the at least one extension part of the flexible protrusion; and
an adjustable screw, inserted through the first hole and the second hole, the press plate being attached onto a proximal end of the adjustable screw, the adjustable screw being capable of being threaded with respect to the first hole or the second hole to actuate the press plate, the at least one extension part and the protruding part, so as to adjust a gap between the protruding part and the teeth meshed with the protruding part.

13. The adjustable lift support apparatus of claim 11, wherein the sleeve further has at least one rib formed on the inner surface and the at least one rib contacts the outer surface of the shaft, so as to reduce friction when the sleeve moves with respect to the shaft.

14. The adjustable lift support apparatus of claim 11, wherein the shaft further has at least one rib formed on the outer surface and the at least one rib contacts the inner surface of the sleeve, so as to reduce friction when the sleeve moves with respect to the shaft.

15. The adjustable lift support apparatus of claim 11, wherein the sleeve and the shaft both are pillar-shaped.

16. The adjustable lift support apparatus of claim 11, wherein the sleeve and the shaft both are arc-shaped.

17. The adjustable lift support apparatus of claim 11, wherein each of the teeth of the at least one rack has a top surface and a bottom surface, when the adjustable lift support apparatus is used, the top surface faces the support and the bottom surface faces the base, and the oblique angle of the top surface is smaller than the oblique angle of the bottom surface, such that the external force applied to lift the support is less than the external force applied to lower the support.

18. The adjustable lift support apparatus of claim 11, wherein the at least one rack and the shaft are formed integrally.

19. The adjustable lift support apparatus of claim 11, further comprising a resilient member positioned within the sleeve and between the support and the second end of the shaft, so as to assist the sleeve in moving with respect to the shaft.

20. The adjustable lift support apparatus of claim 11, further comprising a resilient member, positioned between the inner surface of the sleeve and the outer surface of the shaft, via a third end of the resilient member attached onto the inner surface of the sleeve, and via a fourth end of the resilient member attached onto the outer surface of the shaft, so as to assist the sleeve in moving with respect to the shaft.

* * * * *